United States Patent Office 3,380,717
Patented Apr. 30, 1968

3,380,717
BINLESS BATCHING SYSTEM
George E. Adams and Ralph W. Adams, Ypsilanti, Mich., and Ralph A. Horton, St. Paul, Minn., assignors to Ramsey Engineering Company, St. Paul, Minn., a corporation of Minnesota
Filed May 12, 1967, Ser. No. 638,080
12 Claims. (Cl. 259—154)

ABSTRACT OF THE DISCLOSURE

Subgrade hoppers with their inlets at substantially ground level allow the various aggregates to be dumped directly into the proper hopper or to have the aggregate stored alongside so that it can be pushed in as needed. The aggregates are withdrawn sequentially from the underground outlets of the hoppers and each aggregate is weighed in turn by a single conveyor scale. The accumulated material composed of the individually weighed aggregates is then forwarded to a mixer where cement and water are added.

Background of the invention (1) *Field of the invention.*—This invention relates generally to the weighing and conveying of granular or particulate material, and pertains more particularly to a system of supplying aggregates to a concrete mixer in the proper amounts.

(2) *Description of the prior art.*—It has been conventional practice to utilize a weighbatcher to both collect and weigh the various granular materials that are to be employed in the making of concrete, and to transport the collected materials to the site of the mixer. The weighbatcher has consisted of a wheeled vehicle carrying a scale device in a hopper of sufficient capacity for all of the material to be introduced into the mixer at one time. Sometimes, though, an alternate to the foregoing practice has made use of a stationary weighing hopper and a larry car which receives the weighed materials and carries them to the mixer. In either situation, it has been necessary to have the stock or supply of the several ingredient materials stored in overhead bins of considerable size in order to permit the gravity feed of such materials to take place into the weighing hopper. To assure continuous operation of such procedures, it has been essential that these overhead bins have enough capacity for several hours or even days of operation. Consequently, the cost of their construction, including the supporting structure, has been a large portion of the total cost of a concrete making facility. Usually, such facilities are devoted to the making of concrete blocks, it should be mentioned, although the mixed concrete sometimes is delivered by trucks to construction locations.

Summary of the invention

The present invention, by providing for the storage of large amounts of granular material at ground level, allows the material to be elevated after it is weighed rather than before, thereby obviating the storage of the supply of material at elevated locations, which is quite costly to do because of the foundations and supporting structure that are required.

Quite briefly, the system exemplifying the present invention includes several ground level hoppers or cavities in which the several aggregates or other particulate material can be dumped directly from trucks or pushed by bulldozers from piles of the aggregates placed adjacent the various hoppers. A feeder belt is located under each of the hoppers so as to withdraw aggregate from its particular hopper. This is done in sequence and the sequentially withdrawn aggregate is delivered to a common belt conveyor which carries the related material over a conveyor scale. The amount of each aggregate passing over the conveyor scale causes a chain of pulses representative of such material to be delivered first to one preset counter, then a second and then a third (the precise number depending upon the complexity of the system and the number of aggregates required). The first preset counter stops the drive motor for the first feeder belt when the requisite amount of aggregate has been weighed, and the second counter does the same, as well as the third counter. The weighed aggregates are discharged into a skip and then forwarded to an elevated mixer where the cement and water are added. The mixed concrete is gravitationally discharged into a hopper from which the concrete can be withdrawn for use in a concrete block making machine. Thus, the various feeders or conveyor devices for delivering the proper amounts of aggregate are programmed for sequential operation. The preset counters assure that metered amounts of such materials are delivered to the skip and in turn delivered to the mixer.

Description of the preferred embodiment

Figure 1A:
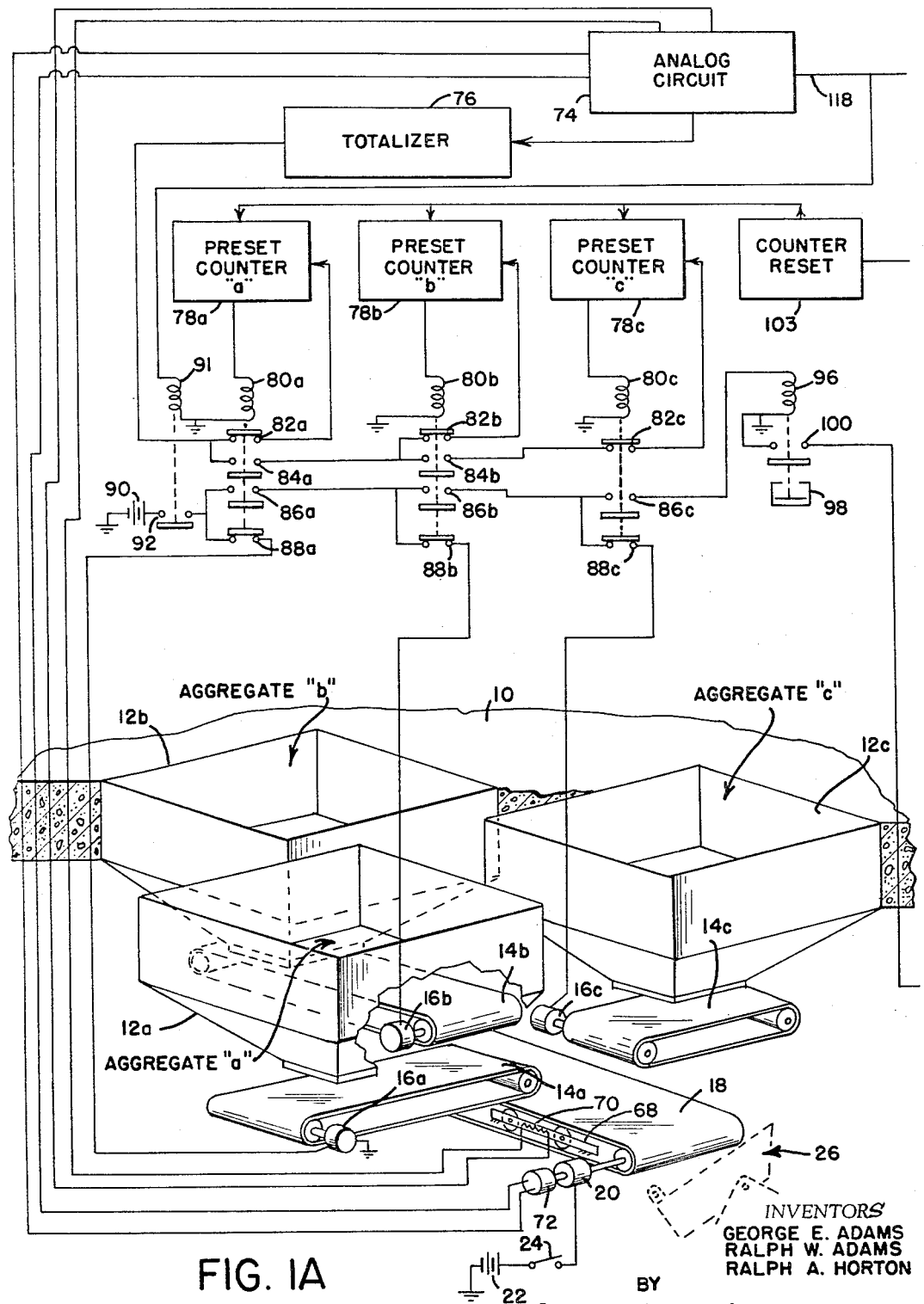
FIGURES 1A and 1B when placed together in a side-by-side relationship constitute the sole schematic diagram exemplifying the invention.

In the drawing, the datum plane with which the invention will be described has been designated as ground level and has been given the reference numeral 10. It will be appreciated, though, that the term "ground level" is to be deemed embracive of elevated platforms over which trucks can move in order to deliver the aggregates and that the term that has been selected really means a reference or datum plane as above indicated. However, it will be appreciated as the description progresses that the greatest economy of operation is to be found where mechanical superstructures are completely eliminated.

At any rate, assuming that three different types of aggregates are to be handled, which can be identified merely as aggregate $a$, $b$ and $c$, aggregate $a$ is contained in a storage hopper 12$a$, aggregate $b$ in a storage hopper 12$b$ and aggregate $c$ in a third storage hopper 12$c$. From FIGURE 1A, it will be seen that the inlet openings to these hoppers 12$a$, 12$b$ and 12$c$ are flush with the ground level 10. This greatly facilitates the delivery of the various aggregates to the proper hopper, for a truck can dump its load directly into the appropriate hopper or the particular aggregate can be deposited alongside the inlet opening and then pushed into the appropriate hopper by a bulldozer. While the size of the hoppers 12$a$, 12$b$ and 12$c$ is susceptible to rather wide variation, each hopper can have a capacity of, say, approximately 100 cubic feet. Since the hoppers 12$a$, 12$b$ and 12$c$ are embedded in the ground in the illustrative instance, the outlet openings are well below the ground level 10.

Subjacent each of the outlet openings of the hoppers 12$a$, 12$b$ and 12$c$ are the ends of feeder devices illustrated as conveyor belts 14$a$, 14$b$ and 14$c$, respectively; other feeding devices may be employed, though. Each belt is driven by a motor 16$a$, 16$b$ and 16$c$.

A common conveyor belt 18 driven by a motor 20 collects the individual aggregates $a$, $b$ and $c$ fed by the feeder belts 14$a$, 14$b$ and 14$c$. The motor 20 is energized from a power source 22 through the agency of a switch 24.

The common belt 18 discharges its load as received from the hoppers 12$a$, 12$b$ and 12$c$ at a common vantage locus which has been shown in the form of a skip 26.

Figure 1B:
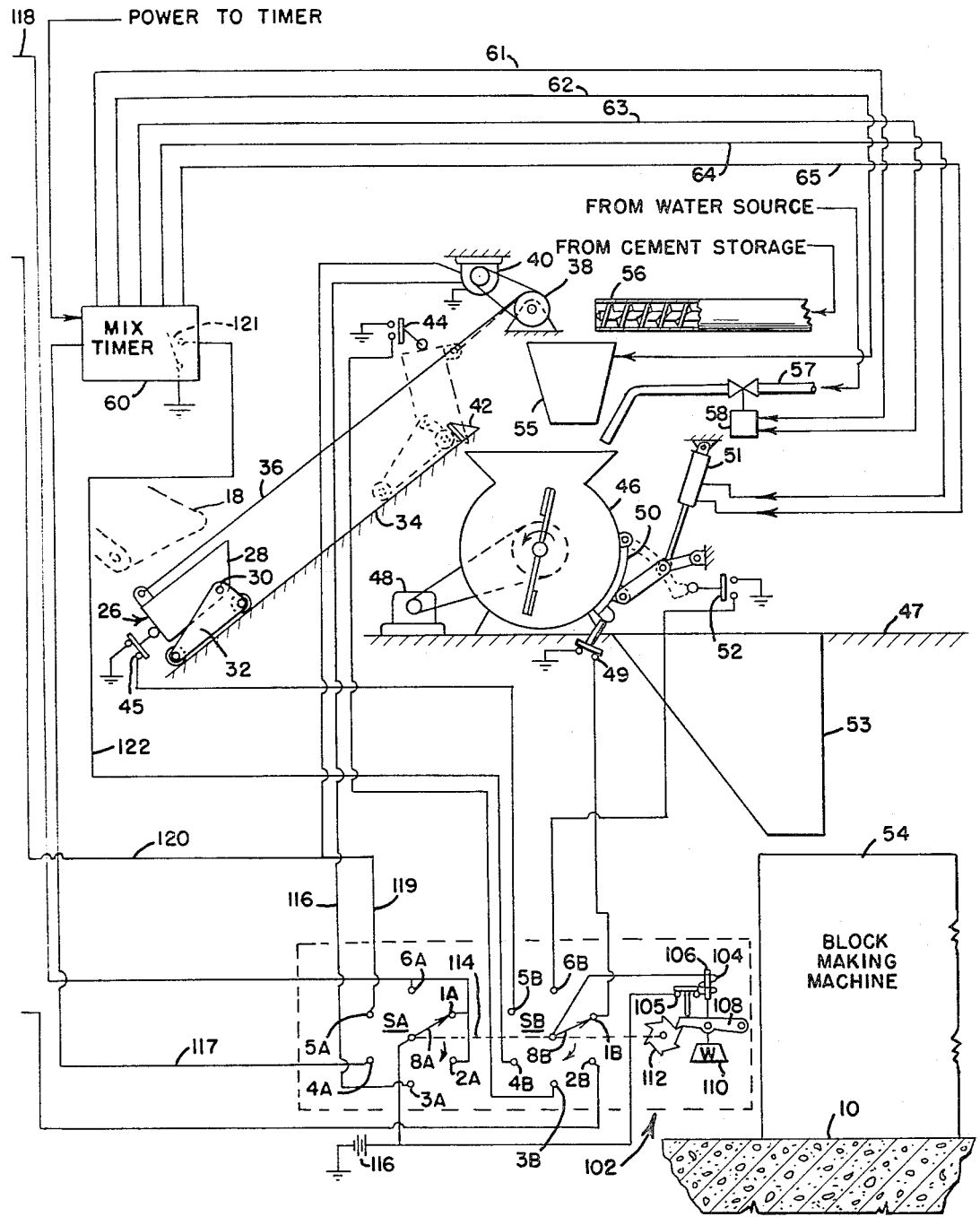

Since the belt 18 discharges into the skip 26, the skip 26 has been superimposed in phantom outline onto FIGURE 1A; likewise, the discharge end of belt 18 has been superimposed in phantom outline onto FIGURE 1B. The skip 26 includes a gondola 28 which is hingedly supported at 30 on a wheeled chassis 32 that traverses an inclined track 34, being pulled up the track 34 by means of a cable 36 connected to a winch 38 which is driven by a motor 40, the motor being automatically braked in a conventional manner except when the motor is energized. At the upper end of the inclined track 34 is a stop or abutment 42 that is struck by the wheeled chassis 32 so that continued actuation of the cable 36 rocks the gondola 28 to dump the material carried upwardly by the skip 26. Although not readily apparent at the moment, there is a normally open switch 44 that is engaged by the gondola 28 as it tilts to dump its load after the skip 26 has reached the upper end of its track 34. A switch 45 signifies when the skip 26 is at the lower end of the track for receiving its load from the common conveyor belt 18.

A concrete mixer 46 is located on the mezzanine floor line labeled 47, this being at a sufficient height so that the mixer can gravitationally discharge its mixed concrete. There is a mixer motor 48 which operates continuously. A normally closed switch 49 indicates when the mixer gate 50 is closed by a pneumatic operator 51. A normally open switch 52 is closed when the mixer gate 50 is open to allow the mixed concrete to pass into a block machine hopper 53 for supplying a concrete block making machine 54. A weighed amount of cement is introduced into the mixer by a cement batcher or scale 55 that receives cement from a cement screw feeder 56. A pipe 57 connected to a feed water source allows water to be added in a controlled amount via a solenoid valve 58.

Those familiar with the concrete art will recognize that the aggregates $a$, $b$ and $c$ will have varying amounts of water already in them. It is necessary to bring the aggregate material to a desired moisture content before adding cement. A signal indicating the moisture content is derived by way of electrodes in the mixer itself, but the showing of such electrodes and the processing of the signal derived therefrom would only complicate the description and has therefore been omitted, the time basis being substituted in its stead. The timer has been denoted by the numeral 60. Therefore, the control line labeled 61 controls the period of time that the solenoid valve 58 is open to add the initial water, the line 62 when the measured cement is released from the scale 55, the line 63 the period for the final water, the line 64 when the mixer gate 50 is to open and the line 65 when the gate 50 is to close. Since the gate operator 51 is preferably pneumatically actuated, the control lines 64, 65 would control air valves (not shown).

In the making of concrete, it is imperative that an accurate control be exercised over the aggregates being added. While three aggregates $a$, $b$ and $c$ have been selected to illustrate the invention, it will be appreciated that a lesser number of aggregates may at times be required and at times a larger number of aggregates. Typical aggregates are fine lightweight materials, coarse lightweight material, sand, and pea gravel. Hence, the hoppers 12a, 12b, 12c can be considered to contain any three of the foregoing specific aggregates.

To provide an accurate signal representative of the weight of each of the aggregates $a$, $b$ and $c$, weighing apparatus is employed in conjunction with the common conveyor belt 18. While the assignee of this application manufactures a very reliable conveyor scale employing a differential transformer, it may be clearer to illustrate the weighing apparatus by a scale 68 utilizing a strain gauge 70 and a tachometer 72. The strain gauge 70 is really in the form of an electrical bridge but only one such component appears in the drawing. The tachometer 72, quite obviously, furnishes a signal in proportion to the speed at which the common conveyor belt 18 is operated. If the belt 18 is run at a constant speed, then the tachometer 72 can be dispensed with. However, the strain gauge 70 would only provide an instantaneous representation of the amount of material passing thereover, whereby a signal that is proportional to the rate of material being conveyed is required. The tachometer 72 introduces the rate factor. The signals from the gauge 70 and tachometer 72 are combined in a multiplying circuit 74 that produces an analog rate signal having a magnitude representing the weight of material per unit time.

The analog signal from the circuit 74 is fed to a conventional pulse totalizer 76. The totalizer integrates the material rate signal with respect to time and generates a series of pulses representing the number of units of material that have passed over the scale 68. Therefore, its reading would indicate the total weight of the aggregates $a$, $b$ and $c$. However, since we are concerned with the amount of each of the aggregates, the pulses from the totalizer 76 are routed via appropriate contacts (soon to be identified) to a selected one of three preset counters 78a, 78b and 78c, there being one for each aggregate. The counters 78a, 78b and 78c can be set, as their name indicates, for a particular pulse count. For instance, if 1,000 pounds of aggregate $a$ is desired and one pulse is representative of a pound, then the counter 78a would be preset for a count of 1,000. If there is to be 1,500 units of aggregate $b$, then the counter 78b can be preset for 1,500 pulses, and if aggregate $c$ is to be in the amount of 2,000 pounds, then a count of 2,000 can be preset into the counter 78c. Preset counters of the envisaged type are quite common and merely operate an internal contact when their registered count has reached the preset figure.

Accordingly, the counter 78a when its preset count is reached and its internal contact is closed energizes a relay 80a, the counter 78b in similar fashion, a relay 80b and the counter 78c a relay 80c. The relay 80a has a set of normally closed contacts 82a, a set of normally open contacts 84a, a set of normally open contacts 86a and a set of normally closed contacts 88a. Similarly, the relay 80b is equipped with normally closed contacts 82b, normally open contacts 84b, normally open contacts 86b and normally closed contacts 88b, whereas the relay 80c has normally open contacts 82c, normally open contacts 86c and normally closed contacts 88c.

A power source 90 is provided and a relay 91 having normally open contacts 92 must have its said contacts closed before the motor 16a for the feeder belt 14a will operate. It will be discerned that the normally closed contacts 88a are in series with the motor 16a. Consequently, the motor 16a is the first to become energized and when the feeder belt 14a has delivered the prescribed amount of aggregate $a$ to the common conveyor belt 18 as determined by the scale 68 and the tachometer 72, the counter 78a then causes the relay 80a to pick up or become energized with the consequence that the normally closed contacts 88a open to disconnect or de-energize the motor 16a.

It should now be apparent that the scale 68 in the common conveyor belt 18 should be as close as possible to the delivery point of all three feeders. This is achieved by quadrantly arranging the hoppers 12a, 12b and 12c, as depicted, so that they all discharge onto their feeder belts 14a, 14b and 14c which in turn feed the aggregate material to only the left end of the common conveyor belt 18. This allows the scale 68 to be quite close to the discharge ends of the belts 14a, 14b and 14c, and the counters 78a, 78b and 78c can be preset for total pulse registrations that will represent only small amounts still left on the common conveyor belt. However, the conveyor belt 18 itself may be as long as needed; it is just that that portion between the feeders and scale should be as short as possible. For instance, the conveyor belt 18 might possess a length such as to terminate in the vicinity of the upper end of the track 34 where the skip 26 dumps, curving upwardly from the end actually depicated in FIGURE 1A in so doing. A surge hopper above the mixer 46 would then be employed, which would receive the materials directly from the belt 18 in its lengthened form, that is, the common conveyor, and would gravitationally deliver the materials into the mixer 46. Thus, in the situation illustrated in the drawing, the skip 26 functions as a receiving and delivery means, whereas where the common conveyor leads to a surge hopper, the surge hopper functions as the receiving and delivery means. Consequently, it will be appreciated that the skip 26 performs a collecting and elevating function in the depicted instance, and that the elevating function would be performed by the longer belt in the unpictured situation.

When the relay 80a picks up, this automatically transfers the pulses coming from the totalizer 76 from the counter 78a to the counter 78b. This is accomplished through the agency of the contacts 84a which become closed and which are in circuit with the normally closed contacts 82b of the relay 80b. Thus, the counter 78b then reecives the pulses. While the counter 78b is counting the pulses, the feed motor 16b is energized via an electrical path which includes the now closed contacts 86a and the normally closed contacts 88b.

When the counter 78b reaches its prescribed count, then the relay 80b picks up so as to transfer the count from the totalizer 76 to the counter 78c. The energization of the relay 78b breaks the circuit to the feeder motor 16b and the feeder belt 94b stops. The path is now paved, though, for the running of the motor 14c via the normally closed contacts 88c of the relay 80c.

When the counter 78c reaches its predetermined count, then the relay 80c picks up to break the circuit to the motor 16c. At this stage of the proceedings, the requisite amount of aggregates a, b, and c, has been deposited on the common or collecting conveyor 18 and the normally open contacts 86c will connect energy from the power source 90 to the coil of the time delay relay 96 having a dashpot 98 and normally open contacts 100. The reason for the time delay provided by the relay 96 is to provide sufficient time for the common conveyor belt 18 to clear itself of all material and the timing of the dashpot will be adjusted accordingly.

Associated with the foregoing apparatus is a programmer 102 that performs a number of supervisory functions in the overall system. The programmer 102 as diagrammatically portrayed includes a stepping switch having a coil 104, an armature 106 for lifting a pawl 108, a weight 110 (or spring) for pulling the pawl 108 downwardly when the coil 104 is not energized, a ratchet wheel 112, a shaft 114 incrementally rotated to advance wiper arms 8A and 8B relative to contacts 1A–6A and 1B–6B of switch levels or selections SA and SB, respectively. For the sake of convenience, a separate power source 116 is shown although the power source 90 would be more typically employed.

The shaft 114 of the programmer 102 is driven forwardly in a clockwise rotational direction by the pawl 108 engaging the ratchet wheel 112. Energy applied to the coil 104 lifts the weight 110 and upon reaching the uppermost position the pawl 108 opens interrupter contacts 105. These contacts, when open, remove energy from the coil 104 and permit the descent of the weight to drive the ratchet wheel 112 through the agency of the pawl 108 and advance the programmer by one position. The interrupter contacts 105 are arranged so that these contacts do not reclose until the weight has reached its lowermost position.

It can now be seen that the programmer contact arm 8A supplies power to perform a needed function of the system and the contact arm 8B prepares the programmer drive circuit to advance the programmer one step on receipt of a circuit closure indicating a performance of the function just initiated.

If it is assumed that the programmer 102 has just arrived at a position in which the contact arm 8A applies power to contact 5A and to conductor or line 119, then this power will command the descent of the skip 26 and the reset of the three preset counters 78a, 78b and 78c. When the skip 26 reaches the lowermost position, the switch 45 will close and energy will be applied to the programmer drive coil 104 via the contact 5B and the contact arm 8B. As has been described, the interrupter contacts 105 will de-energize the coil at the uppermost position of the weight 110, and the programmer will then advance the arm 8A to contact 6A where power will be supplied to the analog circuit 76 and to the relay 91 via conductor 118 to permit the operation of the aggregate delivery system.

The programmer 102 will remain in this position irrespective of the progress of the weighing function until the signal from the timer 60 has initiated the opening of the mixer discharge gate 50 and the switch 52 closes to energize the programmer drive circuit in the same manner as was described for switch 45. Since the contacts 6A, 1A and 2A are all connected to conductor 118, the weighing program will not be effected and the programmer 102 will advance again after the closure of the mixer gate switch 49. If at this time the weighing has been completed and the relay 96 has been energized sufficiently long that the dashpot 98 has permitted the contacts 100 to close, then the programmer will advance so that the arm 8B moves again to the position in which it engages contact 3A. If the weighing of the aggregates has not been completed, the advance of the programmer 102 will await the completion of this event.

However, when the contacts 100 are closed, thus signifying that the weighing has been completed, an electrical path is made through the wiper arm 8B and the contact 2B so that the coil 104 is again momentarily energized with the consequence that another advancement of the shaft 114 takes place. Such action brings the wiper arm 8A into engagement with the contact 3A to cause the skip motor 40 to operate via a conductor 116 in a direction to cause the winch 38 to raise the skip 26. When the skip 26 reaches the upper end of its travel, the gondola 28 is automatically tilted due to the stoppage of the chassis 32 by the abutment 42 and the contents carried by the skip are in this way dumped. The tilting of the gondola, however, causes the switch 44 to close, thus establishing an electrical path through wiper arm 8B and contact 3B to energize once again the coil 104.

With the wiper arm 8A on the contact 4A, the timer 58 is started via a conductor 117 leading thereto and its operation immediately checked by the wiper arm 8B and its engagement with contact 4B which causes another advancement of the shaft 114 to be made by energizing the coil 104. Such advancement results in the wiper arms 8A, 8B becoming engaged with their respective contacts 5A, 5B and the described cycle repeats. The contact 5A is in circuit with the motor 40 through the medium of conductor 119 and the motor is in this way operated in a reverse direction to lower the skip 26. Until the skip 26 returns to its position beneath the discharge end of the weighbelt 18, the switch 45 remains open and there is no further advancement of the shaft 114; there is further shaft advancement, though, when the switch 45 is closed by the skip 26. When the gate 50 opens, the mixed concrete is discharged directly into the block machine feed hopper, and then as needed into the block making machine 54 which is at ground level 10.

Although believed obvious, the successive engagement of the wiper arm 8A with the three contacts 6A, 1A and 2A allows a succeeding aggregate weighing operation to be conducted while the mixer 46 is mixing the already delivered weighed aggregates with the water from the pipe 57 and the cement from the scale 55, these last two ingredients being under the control of the direct timer 58. The skip 26 must be in a position to receive the weighed aggregates before a weighing cycle can begin, assurance of this being through the agency of the switch 45.

A counter reset 102 is used for returning the various counters 78a, 78b and 78c to their initial or zero condition. It receives its signal from the switch contact 5A over a conductor 120 connecting with the conductor 119 which in turn is connected to contact 5A. By means of contacts 121 within the mix timer 60 and a conductor 122 leading to the contact 4B, the programmer 102 is informed that the timer has fully responded.

Since it is an objective of our system to keep the hopper 53 supplied with concrete, the system may be temporarily shut down when additional concrete is not required for the block making machine 54. A probe (not shown) located in the hopper 53 would simply cause contacts (also not shown) serially disposed in the conductor 116 to close when more concrete is needed. When open, such contacts would postpone further aggregate weighing.

Consequently, the aggregates from the storage hoppers 12a, 12b and 12c are sequentially withdrawn, this being accomplished by energizing the several feeder belts 14a, 14b and 14c in sequence and for periods that will result in the requisite amount of aggregates being delivered from each of the storage hoppers. It should be appreciated that the hoppers 12a, 12b and 12c need not store huge quantities of aggregate, for the aggregate can be conveniently added as needed, either directly by trucks dumping into the hoppers or depositing their loads adjacent to the hoppers so that the hoppers can be easily replenished as circumstances dictate. It will be further appreciated that a system of the contemplated type allows only one common conveyor belt 18 to be used and only one weighing mechanism need be employed in conjunction with such a belt. Therefore, this simplification of equipment further lowers the cost of a system constructed in accordance with the teachings of the present invention.

We claim:

1. A binless batching system comprising a plurality of subgrade hoppers for storing granular materials to be mixed together, each hopper having an inlet disposed at a datum level and an outlet below said level, a feeder for each hopper having one end disposed beneath the outlet of the particular hopper with which it is associated, a common conveyor for collecting the respective materials received from said feeders and transferring said materials to a subgrade vantage point, weighing means associated with said common conveyor for providing signals representative of the amount of material carried by said common conveyor, and means controlled by said weighing means for operating said feeders in sequence to control the weight of each individual material in accordance with a desired weight for each such material.

2. A binless batching system in accordance with claim 1 in which said datum level is the surface of the ground, and said feeders and said common conveyor are underground.

3. A binless batching system in accordance with claim 2 in which said feeders are angularly arranged so that each feeder discharges the particular material received from its associated hopper onto said common conveyor at substantially the same collecting location, and in which said weighing means is disposed near said collecting location.

4. A binless batching system in accordance with claim 3 in which there are three hoppers quadrantly disposed, and said feeders constitute elongated conveyors arranged at right angles to each other.

5. A binless batching system in accordance with claim 2 including a mixing station above ground level and means for transporting the weighed material delivered from said common conveyor to said mixing station.

6. A binless matching system in accordance with claim 5 in which said granular materials are aggregates for use in making concrete blocks, the system including means for adding cement and means for adding water to said mixer, and means controlled by said transporting means for preventing the addition of cement and water until the weighed aggregates have been deposited in said mixer.

7. A binless batching system in accordance with claim 1 in which said weighing means provides pulses representative of the weight of the materials carried by said common conveyor, and a preset counter for each feeder, each of said counters controlling the operation of its feeder in accordance with a preset number of pulses which is indicative of a desired weight of a given material.

8. A binless batching system in accordance with claim 7 including means actuated by one counter for transferring the pulses to the next counter after the first counter has reached its preset count.

9. A binless batching system in accordance with claim 8 including a mixer, means for receiving the material discharged from said common conveyor for delivery to said mixer, and means for precluding delivery of said material from said receiving means into said mixer until all of said counters have reached their preset counts.

10. A binless batching system in accordance with claim 9 in which said receiving means includes a receptacle which dumps into said mixer to effect said delivery.

11. A binless batching system in accordance with claim 9 in which said receiving means includes a skip.

12. A binless batching system in accordance with claim 9 including means for operating said weighing means to weigh the next batch of materials while the preceding batch is being mixed.

References Cited
UNITED STATES PATENTS

| | | | |
|---|---|---|---|
| 2,344,228 | 3/1944 | Barber | 259—154 |
| 2,631,827 | 3/1953 | Saxe | 259—154 |
| 2,867,336 | 1/1959 | Soldini | 259—154 |
| 2,877,524 | 3/1959 | Bishop | 259—154 |

ROBERT W. JENKINS, *Primary Examiner.*